Sept. 13, 1955

C. S. R. STOCK 2,717,669

SHOCK ABSORBER WITH RESERVOIR BAFFLE

Filed Feb. 19, 1952

INVENTOR:

CHARLES SAMUEL ROBERTS STOCK by Walter S. Pleston

ATTORNEY

Sept. 13, 1955     C. S. R. STOCK     2,717,669
SHOCK ABSORBER WITH RESERVOIR BAFFLE
Filed Feb. 19, 1952     2 Sheets—Sheet 2

INVENTOR
CHARLES SAMUEL ROBERTS STOCK
by Walter S. Pleston
ATTORNEY

United States Patent Office 2,717,669
Patented Sept. 13, 1955

2,717,669

SHOCK ABSORBER WITH RESERVOIR BAFFLE

Charles Samuel Roberts Stock, Shirley, near Birmingham, England, assignor to Girling Limited, Birmingham, England, a British company Application February 19, 1952, Serial No. 272,298

Claims priority, application Great Britain February 24, 1951

4 Claims. (Cl. 188—88)

This invention relates to improvements in shock absorbers or dampers of the direct-acting or telescopic type in which a cylinder filled with oil or other liquid and a piston working in the cylinder are adapted to be connected between the chassis of a vehicle and a wheel or axle. The piston is carried by a rod working through a closure at the upper end of the cylinder and a seal for the rod is provided at the outer end of an annular space in the closure which normally communicates by way of a passage or port in the closure with the upper end of a recuperation chamber so that any liquid forced under pressure past the piston-rod into that space can drain back into the recuperation chamber. The recuperation chamber may be formed by a closed longitudinally extending chamber on one side of the working cylinder but usually it is formed by a cylindrical shell surrounding and concentric with the cylinder, and the upper end of the shell is closed by a part of the closure for the cylinder.

In some dampers of this type the bottom end of the recuperation chamber is closed by a member carrying means for connecting it to the axle of a vehicle and this end of the cylinder is closed by a housing for spring-loaded valves controlling the passage of liquid between the cylinder and the recuperation chamber. The recuperation chamber must necessarily be only partially filled with liquid which normally only occupies about the lower half of the chamber. In the operation of the shock absorber when the assembly shortens on the "bump" stroke a certain amount of liquid passes from the cylinder below the piston through a spring-loaded valve in the piston to maintain the space above the piston full of liquid and the remainder of the displaced liquid flows through one of the valves in the housing at the bottom of the cylinder into the recuperation chamber.

On the extension or "rebound" stroke liquid above the piston is forced through another valve in the piston into the space below it and liquid is also drawn into the space below the piston from the recuperation chamber to compensate for the volume above the piston occupied by the piston-rod, the diameter of which is normally about half that of the piston.

When the damper is in use any liquid forced past the piston-rod into the space in the upper closure tends to pick up and be mixed with air and flows into the air space in the upper part of the recuperation chamber in the form of froth. Frothing is also caused by the to and fro movement of the liquid in the recuperation chamber itself, and as the operation of the damper depends on the substantial incompressibility of the liquid at the pressures employed the passage of any froth into the cylinder materially reduces the resistance offered by the liquid to relative movement between the cylinder and piston and the damper ceases to function properly.

According to my invention, in a damper of the type set forth the space in the upper closure for the cylinder which receives liquid forced past the piston rod is connected by a pipe or tube to the lower part of the recuperation chamber at a point below the normal level of the liquid therein so that the liquid passing the piston-rod is kept out of contact with the air in the upper part of the recuperation chamber and frothing of the liquid is eliminated or reduced to a minimum.

In combination with this feature I preferably provide an annular baffle in the recuperation chamber in the form of a coiled garter spring fitting around the cylinder. The diameter of the spring coils is substantially equal to the radial spacing between the cylinder and the wall of the recuperation chamber, and the ends of the spring may conveniently be anchored to the longitudinal tube. The axial position of the baffle may be about or below the normal level of the liquid in the recuperation chamber.

Two practical forms of telescopic shock absorber embodying my invention are illustrated in the accompanying drawings in which.

Figure 1:
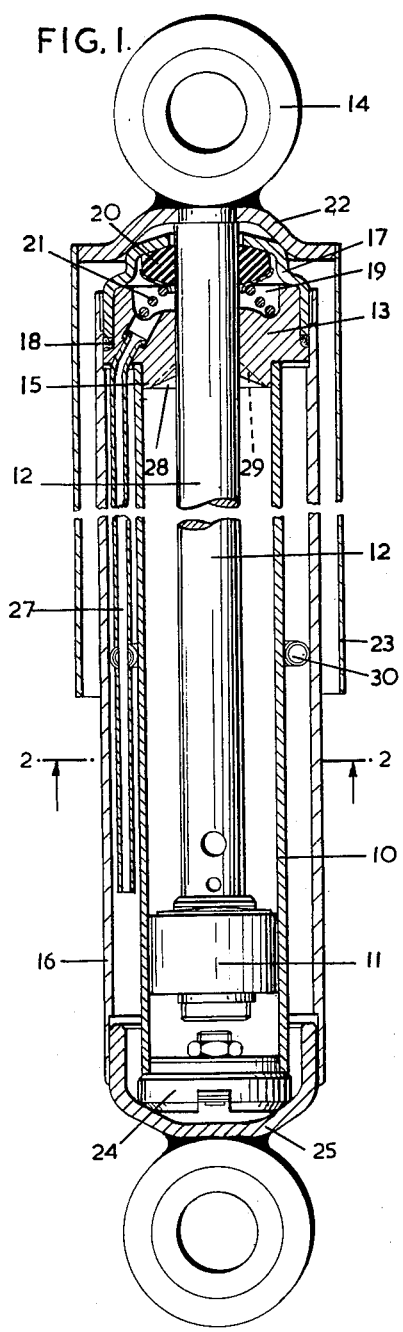
Figure 1 is a longitudinal section of a shock absorber with the piston-rod and piston in full.

In both forms of shock absorber shown in the drawings 10 is the working cylinder of the shock absorber which is a steel tube. A piston 11 working in the cylinder is mounted on a piston-rod 12 working through a closure 13 at the upper end of the cylinder and having on its outer end means such as a rubber-bushed eye 14 for connecting it to the chassis of a vehicle. The closure 13 has at its inner end a spigot part 15 which is a press-in fit in the end of the cylinder and the outer end of the closure closes the upper end of a cylindrical shell 16 surrounding and concentric with the cylinder. The closure is formed in two parts, the inner part which fits into and closes the cylinder and an outer part 17 which closes the shell 16, the outer part being screwed into the shell with a packing ring 18 at its inner end to make a fluid-tight joint. An annular space 19 between the two parts of the closure houses at its outer end a seal 20 which is compressed around the piston-rod by a spring 21. Above the closure the piston-rod carries a dished pressing 22 on which is mounted a skirt 23 fitting down over the upper part of the shell 16 to form a dust cover.

The shell 16 forms a liquid reservoir or recuperation chamber for the working cylinder with which it is in communication through oppositely acting spring-loaded valves in a closure 24 for the lower end of the cylinder which is held against a closure 25 welded to the bottom of the shell 16. The closure 25 has welded to it a rubber-bushed eye 26 for connection to a wheel or axle. Further spring-loaded valves are arranged in the piston 11 to allow liquid to pass through the piston in both directions under predetermined pressures.

When the shock absorber is in use a certain amount of liquid is forced between the piston-rod and the closure 13 and passes into the annular space 19. Usually a small passage is drilled in the closure connecting the space 19 with the shell 16 so that any liquid which has entered that space can drain back into the recuperation chamber.

According to my invention the space 19 is connected to the recuperation chamber by a tube 27 which extends downwardly through the chamber to a point below the normal level of the liquid therein so that any liquid passing the piston-rod is delivered into the main body of the liquid without coming into contact with the air in the upper part of the recuperation chamber.

It is essential that the connection of the tube 27 to the closure 13 should be effectively airtight. This is necessary because on the change of direction of the piston at the end of a stroke a momentary drop in pressure will occur in the cylinder above the piston, thus causing a slight suction in the space 19, and if the connection of the tube were not airtight a small quantity of air might be drawn into the space from the upper end of the recuperation chamber and this air would then have to be expelled through the tube.

The lower end of the closure 13 is preferably formed with a conical recess 28 which may have radial grooves 29 in it to trap any air finding its way to the upper end of the cylinder so that the air is expelled into the space 19 and through the tube 27 into the recuperation chamber.

Figure 2:
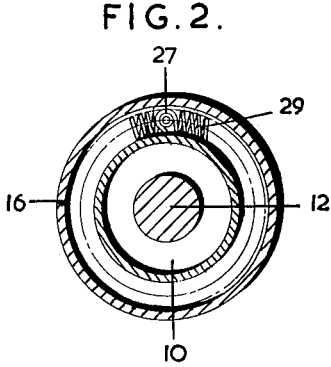
Figure 2 is a transverse section on the line 2—2 of Figure 1.
Figure 3:
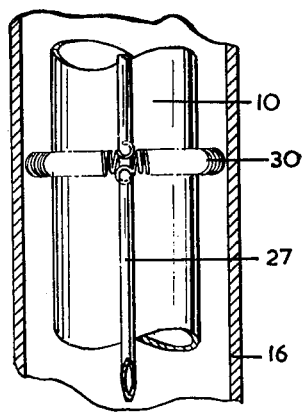
Figure 3 is a fragmentary view showing the baffle and a portion of the drain tube.

In the arrangement shown in Figures 1 to 3 an annular baffle 30 is provided in the recuperation chamber at a point about or below the normal level of liquid therein to damp the movement of the surface of the liquid and prevent aeration and frothing of the liquid caused by to and fro movement of the liquid in the recuperation chamber.

The baffle 30 comprises a coiled garter spring fitting around the cylinder. The diameter of the spring coils is substantially equal to the radial spacing between the cylinder and the wall of the recuperation chamber, and the ends of the spring may conveniently be anchored to the tube 27. In the arrangement illustrated the ends of the spring are hooked around an annular groove in the tube which locates the baffle in the correct position and holds it against axial displacement.

Further, as the discharge end of the tube lies some distance below the baffle there is no risk of the tube being uncovered by any washing about of the surface of the liquid in the recuperation chamber.

Figure 4:
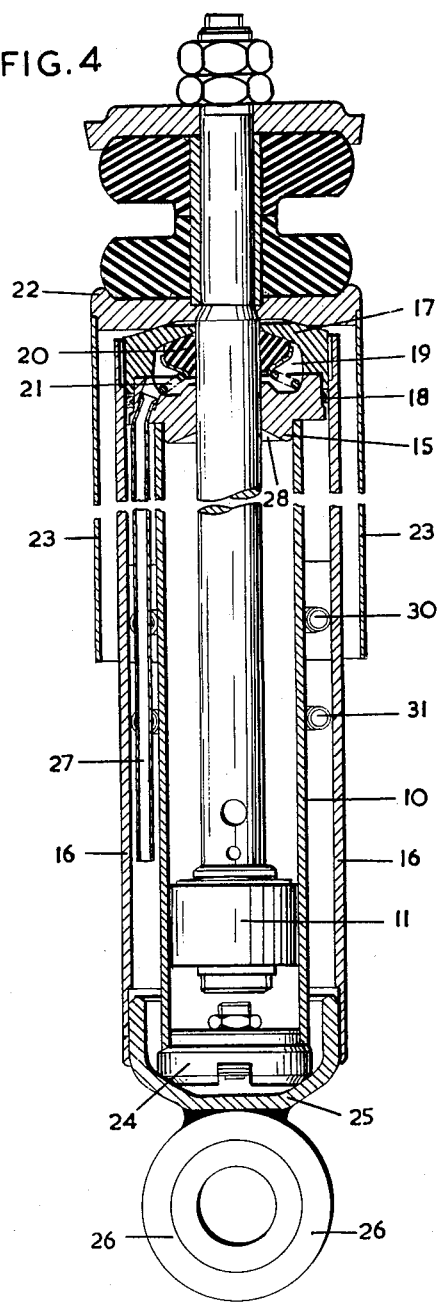
Figure 4 is a longitudinal section of another shock absorber having two axially spaced baffles.

In the modification shown in Figure 4 two axially spaced baffles 30 and 31 are provided in the recuperation chamber. That arrangement is preferred where very severe conditions may be encountered as for example on cross-country vehicles. The second baffle 31 is located at a point considerably below the normal level of the liquid in the recuperation chamber to take care of conditions involving consumption of liquid.

The tendency for the liquid to froth increases with rise of temperature which reduces the viscosity of the liquid so that there is more surging and washing about of the liquid in the recuperation chamber, and also with reduced viscosity more liquid will escape past the piston-rod and so increase the effect of aeration.

Experimental tests have shown that my invention is extremely effective in preventing frothing at temperatures up to and above those likely to be experienced in practice and that the maximum benefits of the invention are obtained when the shock absorber is operating under adverse conditions.

At very low temperatures the viscosity of the liquid increases considerably but the formation of the baffle is such that it permits adequate flow for recuperation purposes at temperatures down to or even below zero Fahrenheit.

I claim:

1. An hydraulic damper of the kind specified comprising a working cylinder, a cylindrical recuperation chamber surrounding and concentric with said working cylinder, a closure sealing the upper end of said cylinder and forming an enclosed space in said closure, a piston reciprocable in said cylinder, a piston rod fittingly passing through said closure and said space which receives liquid forced past the piston-rod in the working of the damper, a pipe connected at its upper end in an airtight manner to said space and extending downwardly into the recuperation chamber and terminating at a point below the normal level of the liquid therein, and a baffle comprising a coiled garter spring located in the annular space between the cylinder and the wall of the recuperation chamber adjacent to the said normal liquid level, said tube and garter spring serving to reduce to a minimum aeration and frothing of liquid in said recuperation chamber.

2. An hydraulic damper as in claim 1 comprising a second baffle axially spaced from said first mentioned baffle and including a coiled garter spring fitting around the cylinder within the annular space between the cylinder and the wall of the recuperation chamber, said second baffle being located at a lower level than said first baffle.

3. An hydraulic damper as in claim 1 wherein the diameter of the spring coils of said baffle is substantially equal to the spacing between the cylinder and the wall of the recuperation chamber.

4. An hydraulic damper as in claim 1 wherein said baffle is anchored to said pipe to locate the baffle in a predetermined axial position in the recuperation chamber and hold it against axial displacement therein.

References Cited in the file of this patent

UNITED STATES PATENTS

| 2,107,974 | Bechereau et al. | Feb. 8, 1938 |
| 2,481,210 | Funkhouser | Sept. 6, 1949 |

FOREIGN PATENTS

| 54,039 | France | Mar. 27, 1947 |
| 645,623 | Great Britain | Nov. 1, 1950 |